Jan. 6, 1953  R. D. WHITE  2,624,790
ENGINE OIL LEVEL INDICATOR
Filed Dec. 17, 1949
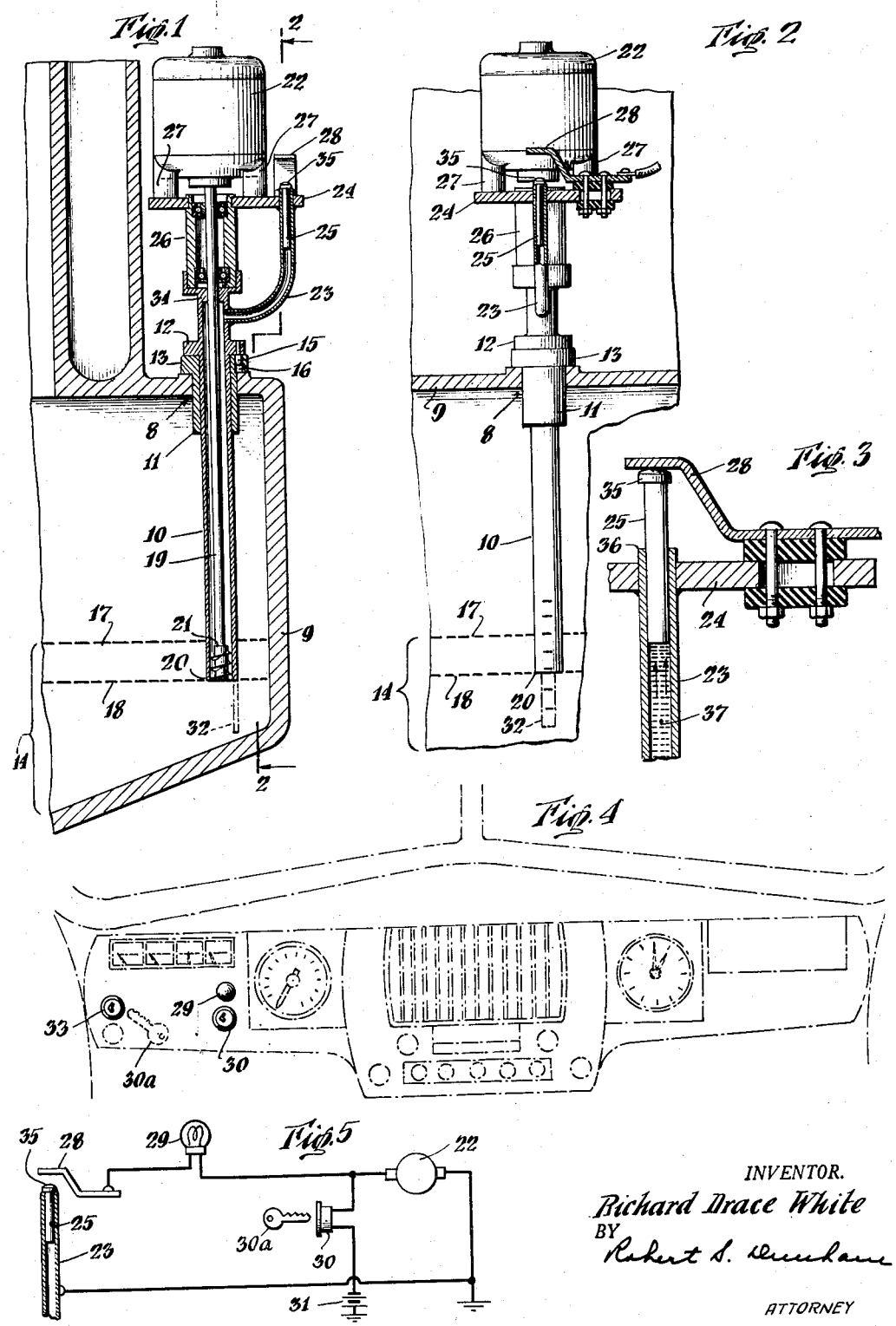
INVENTOR.
Richard Drace White
BY
Robert S. Dunham
ATTORNEY Patented Jan. 6, 1953

2,624,790

UNITED STATES PATENT OFFICE 2,624,790

ENGINE OIL LEVEL INDICATOR

Richard Drace White, New York, N. Y.

Application December 17, 1949, Serial No. 133,550

10 Claims. (Cl. 177—311)

This invention relates to an apparatus and method for producing an alarm or signal to indicate the level of a liquid in a container, and more particularly is related to a method and apparatus for indicating the level of oil in the crankcase of an automobile engine by giving a sensory signal when there is sufficient oil.

The present general practice in determining the level of oil in an automobile engine is to withdraw the so-called "dip stick" from the crankcase, remove the oil therefrom and replace, and again remove the dip stick to obtain a measurement of the amount of oil in the sump of the crankcase. The stick is provided with graduated markings to indicate the number of quarts or other measure of oil level in the crankcase. To take such measurement, it is necessary to raise the hood of the automobile, and the measuring itself entails the handling of the oily dip stick. Oil is often allowed to drip on outer surface of the car or its fender. Frequently a dirty cloth is used to remove the oil from the dip stick before making the measurements, and the cloth may transfer dirt or grit to the stick. The dirt is thereafter introduced into the crankcase when the stick is returned for measuring.

The dip stick measuring, besides its physical inconvenience, is not altogether accurate, for frequently the stick is not inserted deeply enough into the sump of the crankcase, or an attempt is made to read the oil level on the stick without first wiping and re-inserting it. The constant vigilance exercised by automobile owners with regard to the oil level in the crankcase springs from the fear that the oil will get too low and result in serious damage to the automobile motor.

An important object of the present invention is to provide a positive and automatic means of assuring the car operator that the level of oil has not dropped below the danger point.

A further object of the invention is to provide an automatic means which may be operated from the dashboard of the automobile and which will provide a sensory signal on the dashboard for determining whether sufficient oil is present in the crankcase of the automobile.

A still further object of the invention is to provide a device which may be automatically or manually operated for determining whether sufficient oil is present in the crankcase of an automobile, and when automatically operated, the presence of sufficient oil may be determined without raising the hood of the automobile.

Other and further objects and advantages will be appreciated from a description of the invention. For purposes of describing the invention, reference is made to the drawings, wherein:

Fig. 1 is a transverse elevation or end view of one example of apparatus embodying the invention, mounted in operative position in an automobile crankcase, the view being partly in vertical section;

Fig. 2 is a side view of the apparatus taken on the line 2—2 in Fig. 1;

Fig. 3 is a detail view, chiefly in vertical section, of the liquid actuated switch mechanism;

Fig. 4 is a view of the dashboard of an automobile indicating the positioning of the signal device thereon, and Fig. 5 is a wiring diagram of the apparatus.

Referring to Fig. 1, the wall 9, shown in section, is a portion of the sump, or lower part of the crankcase of a standard automobile, having an opening 8 (in an upper, more or less horizontal wall portion) through which a dip stick, i. e., a graduated metal or wooden stick for oil measurement, is ordinarily introduced.

The apparatus of this invention includes a cylindrical tube 10 of appropriate shape and dimensions to enter the opening 8 in the crankcase 9 instead of the dip stick, and of specific size to engage slidably the inner surface of the collar or bushing 11, such as is usually provided in the opening 8 to receive and hold the dip stick. A shoulder 12 is fixed on the outside of the tube 10 and is adapted to engage and abut the shoulder 13 of the collar 11 and thereby to establish the level to which the lower end 20 of the tube 10 will be immersed in the oil body 14 contained in the crankcase. Either one of the shoulders, such as the shoulder 12 of the tube 10 in the device shown, may be provided with a pin 15 extending therefrom and adapted to enter a corresponding hole 16 provided in the other shoulder, for example the shoulder 13, so as to insure convenient or correct orientation of the tube in the opening 8 and to keep the tube 10 from revolving in the collar 11.

The lower open end 20 of the tube 10, as shown in Fig. 1, is below the normal or desired oil level 17 but above the level 18, which is the level at which additional oil should be added.

A thin shaft 19 is axially disposed in the tube 10; the shaft being sufficiently slender to permit oil to flow around it and through the tube. An impeller type pump device 21, for example a simple screw-type device having one or more turns of thread, is fixedly mounted at the lower end of the shaft 19, e. g. in the mouth of the tube 20. The shaft 19 extends upward through the closed end of the tube 10 and is connected to a small electric motor 22, which is supported on platform 24. The shaft 19 passes upward through the closed end 34 of the tube 10 and may be packed and supported in suitable bearing and gland structure, such as is indicated at 26, mounted between the upper end 34 of the tube 10 and the platform 24. The electric motor 22 is appropriately supported on the platform 24, as by posts 27. An auxiliary tube 23 communicates with the tube 10 adjacent the upper end thereof and extends vertically upward through the supporting plate, or platform 24. A piston 25 is mounted slidably in the vertical portion of the tube 23 and is normally depressed in the tube 23, by its own weight, as shown in Figs. 1 and 2.

The upper end of the piston 25 is provided with a crown or shoulder 35 to abut the upper edges 36 of the tube 23 to maintain the piston in the upper end of the tube 23. The piston is adapted to be forced upward by the upward pressure of the oil 37 in the tube 23 (when the impeller 21 is operating below the oil level 17), as shown in Fig. 3, so that the crown 35 of the piston 25 makes contact with the terminal 28, the terminal 28 acting as the upper limit of the movement of the piston 25 and thus preventing the latter from being forced entirely out of the tube 23. The contact of the piston 25 with the terminal 28 acts as a switch for a circuit to light the sensory signal 29, as shown in Fig. 5 and described below. The described structure, including the fit of the tube 10 in the collar 11 and including the arrangement of the piston 25 in the tube 23, the crown or head 35 on the piston, and the contact element 28 in the path of piston movement, is effective to prevent any undesirable leak or drip of oil from or around the conduit system 10—23 when the impeller 21 is operating or otherwise.

Referring to Fig. 5, the wiring diagram for the apparatus, the oil impeller is driven by motor 22 in the circuit including the source of power 31, the dashboard switch 30 and the electric motor 22. The signal light circuit includes the oil actuated piston switch 28, 35, the source of power 31, the sensory signal light 29, and conveniently also the same switch 30. The electrical system of the automobile may be utilized as the source of power for both circuits (e. g. so that the source 31 is the usual storage battery of the car), and both circuits may be suitably grounded, as shown. The switch 30 is normally open, i. e. except when it is desired to use the indicator.

In operation, when the switch means 30 is closed and the electric motor 22 is actuated, the thin shaft 19 and the impeller 21 are rotated, causing oil to be drawn up through the tube 10 into the auxiliary tube 23. As the oil fills the lower reach of the auxiliary tube 23 and builds up pressure in the conduit system, the piston 25 is forced upward so that its crown 35 contacts the terminal 28, thereby closing the circuit of the sensory signal 29. If the oil in the crankcase is below the level 18 (see Figs. 1 and 2) when the switch 30 is closed, the lower end 20 of the tube will be out of contact with the liquid, and consequently the impeller will be unable to draw oil upward through the tube 10, and therefore there will be no oil forced into the auxiliary tube 23, no contact will be made with the terminal 28, and there will be no signal. When no signal is given, the operator is warned that the oil is below the desired level.

It will be appreciated that a mechanical breakdown of the apparatus might result in causing the sensory signal to fail to light, even though there was sufficient oil in the crankcase. However, when the light or sensory signal is actuated there is a positive assurance that the oil level is sufficiently high. In the event the signal light is not illuminated, the operator may withdraw the tube 10 from the hole 8 and make a physical measurement. Thus under the above or indeed any circumstances, the tube 10 may be utilized for effecting such physical measurement (in the same manner as an ordinary dip stick) by providing graduated markings at its lower end, as shown in Fig. 2. In addition, it may be found desirable to have an extension 32 (as shown in the dashed line) on one side of the tube 20. The extension 32 may also be provided with graduated markings for measuring the oil when it has dropped below the level 18 so that it will be possible to determine the extent of the oil deficiency.

Although other types of contacts may be operated or other circuit controlling operations effected by oil-displaced means such as the piston 25, the illustrated contact arrangement has advantages of simplicity, with effectiveness of electrical response. Indeed, it seems greatly preferable to have the signal circuit closed and the signal (i. e. the light 29) operated when the oil level is adequate, rather than to embody a reverse type of operation whereby the signal is interrupted by the pumped oil and permitted to operate upon departure of oil below the effective level; the former type of system, as illustrated, has the safety feature that any failure of the electrical parts or circuit results in the same warning, i. e. absence of signal, as produced by low oil condition, rather than in a possibly false indication that everything is all right.

In order to obtain an accurate measurement of the oil level in the crankcase it is important that the engine of the automobile be turned off so that the oil may have an opportunity to drain back into the sump of the crankcase, and especially so that there will be no turbulence of oil which would permit the impeller 21 to pump oil falsely. To this end it has been found practical to make the switch 30 for operating the oil level indicator a key-operated switch, using the same key 30a as that used for the regular ignition switch 33 of the automobile. Therefore, in order to put the pump 21 in operation it is necessary to remove the key 30a from the ignition switch 33 (see Fig. 4, the key 30a being indicated in dotted lines adjacent the switch 33), and to insert in the switch 30, automatically assuring that the engine of the automobile is not running at the time the oil is measured and that there is no turbulence in the crankcase. Similarly, the key must be removed from the oil level indicator key switch 30, thereby stopping the oil level indicator, before the automobile engine can be started, thus insuring that the oil level indicator is not left in operation. It will be understood that each of the switches 30, 33 may be of well-known type, operable only upon inserting and turning the key.

It will be appreciated from the foregoing description of a presently preferred form of apparatus embodying the invention, that it has great practical utility and provides a means for automatically and positively determining that the automobile has sufficient oil.

It will be noted that the apparatus as described herein may be installed in any standard automobile without any major changes, and indeed in a very simple manner, since the tube 10 is specifically shaped and dimensioned to be introduced through the standard dip stick hole or opening in the wall of the crankcase. This characteristic of the device is an important feature of the invention, permitting its application to automobile engines built without it as well as to such as may be designed to include it initially. Taking like advantage of this feature, or otherwise utilizing one or more of the features of novelty embraced by the invention in its broader aspects, the invention may be applied to other service than for automobile engines; for example, it may be similarly used to indicate the oil level in marine engines, as in motor boats and other vessels powered by internal combustion engines, where the location of the engine is such that the pilot or operator cannot conveniently take a direct physical measurement while he is engaged in operating the vessel. In these as well as in other circumstances where the level of oil or the like for an engine should be periodically checked, the present apparatus affords convenient means for remotely indicating, as at an instrument board adjacent the operator, the status of such level at any time.

It will be understood that the invention is not limited to the specific structure and procedure herein set forth by way of illustration, but may embody variations of structure and may be carried out in other ways and applied to other uses, within its spirit as defined by the following claims.

What is claimed is:

1. An apparatus for indicating whether liquid is present or absent at a predetermined critical level comprising, a tube member having a lower open liquid receiving end adapted to be immersed in a body of liquid to the predetermined level, said tube having an upper closed end, a rotatable shaft journaled in the upper end and extending axially through said tube to the open end thereof, means mounted on the shaft adjacent the lower open end of the tube, and adapted to draw liquid into said tube when and only when the liquid is above the predetermined critical level, means for rotating said shaft to actuate the liquid drawing means, a liquid receiving area associated with the tube, and adapted to receive liquid drawn into the tube, a sensory signal, means for actuating the sensory signal disposed in the liquid receiving area and adapted to be operated by liquid received in the area, said means being operable and said signal being actuated only when liquid is received in said area.

2. An apparatus for indicating the presence of liquid at a predetermined critical level, comprising, a first tube having an open liquid receiving end adapted to be immersed in a body of liquid to the predetermined level, means disposed in said tube for drawing liquid therein, a second auxiliary tube communicating at one end with said first tube and open at the other end, said second tube being vertically disposed adjacent its open end, the auxiliary second tube being adapted to receive liquid drawn into the said first tube, a piston disposed in the open end of said second tube and adapted for sliding reciprocating action into and out of said tube, a contact terminal disposed above and spaced from the open end of said auxiliary tube and adapted to contact said piston as it moves outwardly of said tube, a shoulder provided at the upper end of the piston to maintain it in the upper end of the auxiliary tube, a source of power and a signal light, one terminal of said source of power being connected to one terminal of the signal light and the other terminal of the source of power being connected to the auxiliary tube, the contact terminal disposed above the auxiliary tube being connected to the other terminal of the signal light, the piston being adapted to engage the contact terminal disposed above the open end of the auxiliary tube when liquid enters the auxiliary tube and forces the piston upward.

3. In engine oil level indicating apparatus, in combination, a tube adapted to project into an oil-containing chamber of the engine, controlable means, energizable to apply liquid-withdrawing force, for drawing oil into said tube, an electric signal circuit, circuit-controlling means shiftable selectively into either of two positions for respectively opening and closing said circuit, said means being normally biased into one of said positions, and means associated with said tube and displaced by oil withdrawn therein, for shifting said circuit-controlling means from its said normal position to its said other position in response to the presence of oil in the chamber, accessible to the tube.

4. In engine oil level indicating apparatus, in combination, a tube adapted to project into an oil-containing chamber of the engine, said tube having a lower end to be disposed at a predetermined level of said chamber, an impeller in said tube, means for driving said impeller, an electric signal circuit, and means associated with said tube at an upper part thereof above the impeller and including an element shiftable by oil withdrawn into the tube by the impeller, for controlling said signal circuit to modify the same in accordance with the presence of oil at a level at least as high as the said lower end of the tube.

5. Apparatus as described in claim 4, wherein the impeller is disposed at the lower end of the tube and has a shaft projecting axially inside the tube, and wherein the driving means comprises an electric motor for turning said shaft, said shaft extending through the upper end of the tube to the motor and the tube being closed at said upper end around the shaft, and wherein the circuit-controlling means comprises an oil-receiving cylinder communicating with the tube, said movable element comprising a piston in the cylinder and said circuit-controlling means including a contact device operated by the piston upon displacement thereof by the oil.

6. Apparatus as described in claim 5, wherein the signal circuit includes a signal lamp and extends to a source of current, said contact device comprising a contact terminal disposed in the path of the piston for electrical contact thereby and for preventing displacement of the piston out of the cylinder, said contact terminal and said piston being incorporated in the electrical circuit so that the lamp is illuminated when the piston is displaced by the oil.

7. Engine oil level indicating apparatus adapted for association with an engine having an oil chamber with an upper wall, and having a narrow opening in said wall adapted to receive a dip stick removably disposable in said opening for measurement of oil level in the engine, comprising, in combination, a tube shaped to fit in said opening and adapted to extend through the latter downwardly into the chamber, said tube having a lower end disposed within the chamber and means for abutting the chamber wall to retain the tube with its lower end at a predetermined level, an impeller within the tube adjacent the lower end, a shaft for said impeller extending axially upward inside the tube, a motor mounted adjacent the tube, externally of the chamber, for turning the shaft to drive the impeller, a signal circuit including a contact device for controlling the same, and means associated with the tube and including an element movable by oil drawn into the tube by the impeller, for actuating said contact device to modify the signal circuit when the oil in the chamber is at least at the level of said lower end of the tube.

8. A liquid indicator, comprising in combination, a tube having an open liquid receiving end adapted to be immersed in a liquid body, means for drawing liquid from the body into said tube, sensing means associated with the tube adapted to be actuated by the liquid drawn into the tube, a normally deenergized electrical signal device, a circuit for energizing said device, and normally open contacts in said circuit, said sensing means comprising an element adapted to be displaced by the liquid drawn into the tube, for closing the contacts.

9. Apparatus for indicating the presence of liquid in a chamber at a predetermined critical level thereof, comprising a vessel adapted to receive liquid, a device in the vessel shiftable in response to the presence of liquid in the vessel, said vessel and device being arranged for positive displacement of the device by liquid received in the vessel and only by such liquid, said vessel normally lacking liquid sufficient to shift the device, an electric signal circuit, circuit-controlling means therefor actuated by said device when shifted by liquid in the vessel, and means controllable for operation at desired times and including a tube adapted to extend downwardly into the chamber and connected in controlling relation to the vessel, for withdrawing liquid upwardly from a body of same in the chamber when said liquid is at or above said critical level, to effectuate supply of liquid to the vessel for shifting said device, said tube opening into the chamber at said critical level for preventing withdrawal of liquid by the liquid withdrawing means unless said liquid is at or above said level, and said device being adapted to remain in unshifted position when the liquid withdrawing means is operated but fails to withdraw liquid into the vessel.

10. Liquid level indicating apparatus comprising, in combination, means adapted to be associated with a liquid-containing vessel, and including liquid-level sensitive means, for detecting whether liquid is present at a predetermined level in the vessel, an electrically actuated, normally deenergized signal device adapted to radiate signalling energy, means including an energizing circuit for the signal device and normally open contacts in said circuit, adapted to be closed by the liquid-level detecting means, for actuating the signal device only when liquid is present at or above the predetermined level, and manually controllable means for controlling the signal device actuating means to effect operation of the latter in response to presence of liquid at or above said level, only at desired times.

RICHARD DRACE WHITE.

REFERENCES CITED

The following references are of record in the file of this patent:

UNITED STATES PATENTS

| Number | Name | Date |
|---|---|---|
| 1,559,421 | Greet | Oct. 27, 1925 |
| 1,991,504 | Hopkins | Feb. 19, 1935 |
| 2,141,325 | Werder | Dec. 27, 1938 |
| 2,451,704 | Wood | Oct. 19, 1948 |

FOREIGN PATENTS

| Number | Country | Date |
|---|---|---|
| 828,472 | France | May 18, 1938 |
| 280,037 | Italy | Nov. 28, 1930 |